US010318279B2

(12) United States Patent
Mohammed et al.

(10) Patent No.: US 10,318,279 B2
(45) Date of Patent: Jun. 11, 2019

(54) AUTONOMOUS UPGRADE OF DEPLOYED RESOURCES IN A DISTRIBUTED COMPUTING ENVIRONMENT

(71) Applicant: MICROSOFT TECHNOLOGY LICENSING, LLC, Redmond, WA (US)

(72) Inventors: Yunus Mohammed, Bellevue, WA (US); Pritesh Patwa, Redmond, WA (US); Gregory Marvin Door, Redmond, WA (US); Ravikiran Janardhan Reddy, Redmond, WA (US); Sean David Zimmerman, Bellevue, WA (US); Xiaoxiong Tian, Kirkland, WA (US); Phani Soma Shekar Burela, Bothell, WA (US); Mark Eugene Russinovich, Hunts Point, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 179 days.

(21) Appl. No.: 15/608,871

(22) Filed: May 30, 2017

(65) Prior Publication Data

US 2018/0349130 A1 Dec. 6, 2018

(51) Int. Cl.
*G06F 8/656* (2018.01)
*H04L 29/08* (2006.01)

(52) U.S. Cl.
CPC ............ *G06F 8/656* (2018.02); *H04L 67/322* (2013.01); *H04L 67/325* (2013.01); *H04L 67/34* (2013.01)

(58) Field of Classification Search
CPC . G06F 8/65; G06F 8/658; H04L 67/34; H04L 67/325; H04L 67/322
See application file for complete search history.

(56) References Cited

U.S. PATENT DOCUMENTS

| 2014/0282469 A1* | 9/2014 | Johnson | G06F 8/65 |
| | | | 717/170 |
| 2015/0081910 A1* | 3/2015 | Assuncao | G06F 9/45558 |
| | | | 709/226 |

(Continued)

*Primary Examiner* — Michael A Keller
*Assistant Examiner* — Austin J Moreau
(74) *Attorney, Agent, or Firm* — Shook, Hardy & Bacon, L.L.P.

(57) ABSTRACT

Various methods and systems for autonomously upgrading deployed resources in a distributed computing environment are provided. An autonomous upgrade system identifies updates such as operating system image updates and virtual machine extension updates for deployment in the distributed computing environment. The autonomous upgrade system identifies eligible tenants, identifies deployed resources that may be impacted by the identified update, batches the resources and upgrades the batched resources. The autonomous upgrade system performs a diagnostic test on upgraded resources to determine whether an upgrade was successful. In some embodiments, the diagnostic test is performed by executing a diagnostic script that can be provided by a tenant. The autonomous upgrade system can stop or pause the upgrade if various success metrics are not satisfied. In some embodiments, the autonomous upgrade system tests and certifies newly published updates for deployment to the distributed computing environment.

20 Claims, 6 Drawing Sheets

(56) References Cited

U.S. PATENT DOCUMENTS

2015/0378716 A1* 12/2015 Singh ..................... H04W 4/60
                                                        717/172
2016/0070555 A1*  3/2016 Xiong ................. G06Q 10/063
                                                        717/171
2016/0085543 A1*  3/2016 Islam ....................... G06F 8/65
                                                        717/171

* cited by examiner

AUTONOMOUS UPGRADE OF DEPLOYED RESOURCES IN A DISTRIBUTED COMPUTING ENVIRONMENT

BACKGROUND

Large-scale networked systems are commonplace platforms employed in a variety of settings for running applications and maintaining data for business and operational functions. For instance, a data center (e.g., physical cloud computing platform) may provide a variety of services (e.g., web applications, email services, search engine services, etc.) for a plurality of customers simultaneously. These large-scale networked systems typically include a large number of resources distributed throughout the data center or throughout multiple data centers in a region or multiple regions across the globe. Resources can resemble a physical machine or a virtual machine (VM) running on a physical node or host. In this regard, data centers provide computing systems and associated components that can support compute and storage operations for a variety of compute workloads and operations.

In general, customers of a distributed computing environment (tenants) use the resources of the distributed computing environment. Such resources may include one or more physical or virtual computing machines that include various computer files such as operating system images and virtual machine extensions that support various software applications. For example, tenants may deploy virtual machines to the distributed computing environment using a particular operating system image. Over time, publishers of these computer files may implement version updates, security updates and other fixes. As such, processes to support updates to operating system images and other computer files relied upon by tenants are integral to the provision of distributed computing resources.

SUMMARY

Embodiments described herein provide methods and systems for implementing an autonomous upgrade system for autonomously upgrading deployed resources in a distributed computing environment. At a high level, an autonomous upgrade system implements an upgrade manager component to identify an update to a computer file for deployment in a distributed computing environment. The upgrade manager component identifies in the distributed computing environment a tenant infrastructure having one or more computing machines configured to use the computer file to support operating one or more applications when running in the distributed computing environment. The upgrade manager component accesses a tenant upgrade profile for the tenant infrastructure, and the tenant upgrade profile instructs on an upgrade process for the tenant infrastructure. The upgrade manager component batches the computing machines into one or more batches in accordance with the tenant upgrade profile, deploys a certified update to at least one of the batched computing machines and performs a diagnostic test to determine whether the certified update was successfully deployed.

The autonomous upgrade system may implement a certification component to access a published update to a computer file that supports operating one or more applications. The certification component deploys the published update to a computing machine that uses the computer file and will use the published update of the computer file to support operating one or more applications when running in a test environment. The certification component monitors the health of the one or more applications to determine whether the published update was successfully deployed to the computing machine. When the published update is successfully deployed, the certification component certifies the published update.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
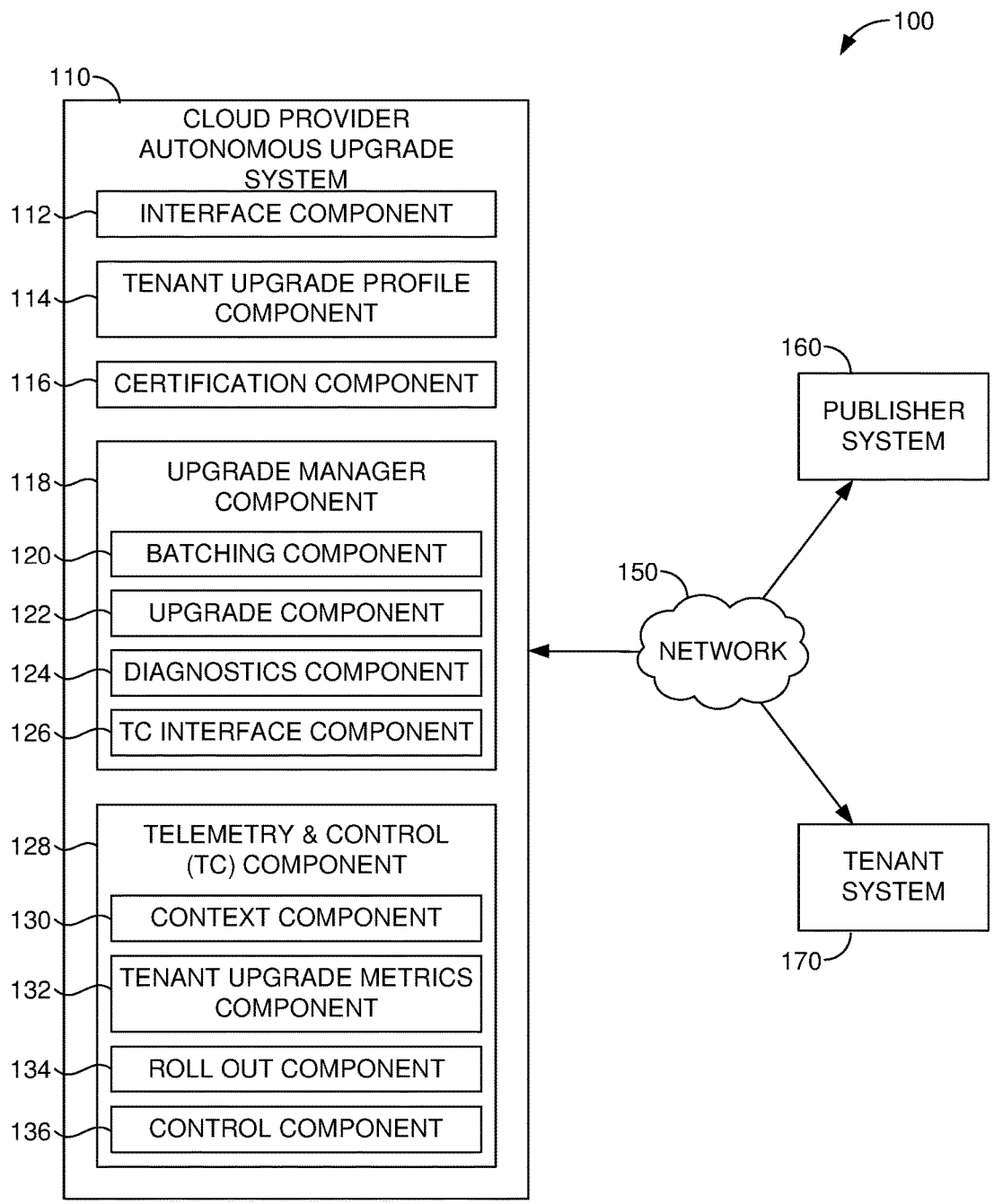
FIG. 1 is a block diagram of an exemplary distributed computing infrastructure and autonomous upgrade system, in accordance with embodiments described herein.

The past few years have seen the advancement of distributed computing technologies, including the expansion of distributed computing resources available for use in a distributed computing environment. Distributed computing resources can include hardware and software available in a distributed computing environment. For example, distributed computing resources can include computer files (e.g., software files) used by physical or virtual computing machines in a distributed computing environment. These computer files may, but need not, originate from the provider of the distributed computing environment. For example, third party publishers may release software that a tenant desires to utilize in the distributed computing environment. Published software may be aggregated in repositories available for use in the distributed computing environment.

More specifically, a distributed computing environment provider (e.g., a cloud service provider) may aggregate repositories of operating system images (OS images), including images published by the cloud service provider and those published by third parties. Customers of the cloud service provider (tenants) can utilize these images, for example, by deploying virtual machines to the cloud using the images. As the virtual machines continue to operate, publishers continually publish new versions of the images which have security updates and other fixes. These newer images can be used to spin up new virtual machines, but in conventional distributed computing environments, the new images are not autonomously applied to existing virtual machines.

Other computer files that support applications running in a distributed computing environment such as virtual machine extensions (VM extensions) may also be aggregated and stored in repositories for use in the distributed computing environment. VM extensions are small applications that provide post-deployment configuration and automation tasks on virtual machines. For example, an extension can be used to complete discrete tasks such as software installation or anti-virus protection. VM extensions can be bundled with a new virtual machine deployment or run against an existing system. Although the following discussion focuses on OS images and VM extensions, the present disclosure is not limited to a particular type of computer file that supports applications running in a distributed computing environment.

Conventional methods for upgrading distributed computing resources deployed to a distributed computing environment have several shortcomings because the tenant currently must manage the upgrade process. For example, tenants must determine whether, when and how to update OS images used to spin up their virtual machines. In this regard, tenants monitor the availability of new OS images, for example, in a cloud service provider's OS image repository. When a new image is available, tenants use manual intervention to update their virtual machines with the new OS images. After the update, tenants monitor the quality of the OS image update and its impact on applications running on their virtual machines. On a basic level, conventional methods could impact the availability of applications running on virtual machines. Such conventional methods additionally represent a resource-intensive process with significant human intervention, which can be time consuming, inefficient, and susceptible to human error. The resulting high turnaround time could leave virtual machines unpatched for extended periods of time with respect to security fixes carried by newer OS images. Other variations and combinations of shortcomings exist with conventional methods for upgrading distributed computing resources deployed to a distributed computing environment. As such, processes to support updates to operating system images and other computer files relied upon by tenants are integral to the provision of distributed computing resources.

In an exemplary embodiment, systems and methods are provided that autonomously upgrade deployed resources in a distributed computing environment. These systems and methods apply the latest publisher updates to deployed resources while ensuring tenant application availability. The systems and methods could be provided as a service that monitors a repository for updated files such as new OS images or VM extensions, and when an update is available, triggers a platform-managed workflow to apply the update to deployed resources such as existing virtual machines. In this manner, publishers of updated files—who may be external entities (i.e., not internal or a part of the distributed computing system provider organization)—can publish updates for automated roll out, controlled by rules baked into an automated roll out system.

Another exemplary implementation might include systems and methods for certifying published updates to computer files such as OS image updates or VM extension updates for deployment to a distributed computing environment. The system and method can monitor a repository for updated files such as new OS images, and when an update is available, trigger a certification process that can include a test deployment. Successfully deployed updates can be certified for deployment to the distributed computing environment.

Accordingly, embodiments described herein provide simple and efficient methods and systems for autonomously upgrading deployed resources in a distributed computing environment, such as the distributed computing environment described in further detail below with respect to FIG. 6. Deployed resources as used herein are distributed computing resources such as physical and virtual machines, and configuration and applications associated therewith, operating in the distributed computing environment. Upgrading a deployed resource refers to the process of applying an update to a computer file that supports one or more deployed resource. Such computer files can include OS images, VM extensions and other files that support applications running in a distributed computing environment. Updates can include patches, revisions, fixes, improvements or other modifications to a computer file, or a portion thereof.

At a high level, the autonomous upgrade system supports a mechanism for upgrading computer files that support one or more deployed resources in a distributed computing environment. In general, the system identifies updates for deployment to the distributed computing environment. For example, the system can monitor the availability of new versions of publisher published files such as OS images or VM extensions in a repository. In some embodiments, only certified updates are identified for deployment, as explained in more detail below. Updates may also be prioritized based on other characteristics of the update. In this regard, updates can be identified as they are made available, or at some later time. More important updates such as critical security fixes can be prioritized over less critical updates such as minor patches. Updates can also be prioritized based on characteristics of a participant. For example, updates published by premium-paying publishers can be prioritized. Updates from publishers that publish large volumes or large files sizes can be prioritized or deprioritized, for example, to facilitate management of distributed computing resources. Various other techniques, algorithms and heuristics for identification and/or prioritization are contemplated within the present disclosure.

The autonomous upgrade system also identifies eligible tenants, including tenants with deployed resources that may be impacted by the identified update are identified. For example, a tenant having spun up one or more virtual machines in a distributed computing environment using a particular OS image with a newly published update may be identified. More generally, a tenant operating a machine—whether physical or virtual—and one or more applications in a distributed computing environment may be identified, for example, when a newly published update is available for a computer file supporting operation of the machine and/or the one or more application. In some embodiments, the system may identify only those tenants that have chosen to participate in an autonomous upgrade service such as by opting in. Tenants may also be prioritized for update deployment, for example, based on payment of a premium or to facilitate management of distributed computing resources. As above with respect to updates, various other techniques, algorithms and heuristics for tenant identification and/or prioritization are contemplated within the present disclosure.

In embodiments, tenant identification is facilitated with the use of a tenant upgrade profile. For example, information relating to a tenant's participation in an upgrade service (e.g., opt-in status, status as a premium customer, etc.) may be stored in association with the tenant upgrade profile. In this manner, tenant upgrade profiles could be used to identify participating tenants. More generally, tenant-preferences (e.g., participation status, preferred batch size, etc.) can be defined by a tenant, for example, while opting for an automatic upgrade feature, and preferences may be associated with an upgrade profile for the tenant. Additionally and/or alternatively, other tenant-specific information may be stored in association with the tenant upgrade profile. By way of non-limiting example, information associated with the tenant upgrade profile may include information relating to tenant context (e.g., characteristics of the tenant infrastructure within the cloud provider system, availability requirements, service level agreements, etc.), information relating to batching (e.g., a default batch size), information relating to determining a successful deployment (e.g., a tenant diagnostic script), and the like. These concepts will be explained in greater detail below.

In various embodiments, the autonomous upgrade system identifies a tenant context. Generally, the tenant context includes characteristics of a tenant infrastructure. For example, the system may determine what resources the tenant has deployed (e.g., physical or virtual machines, applications running on the machines including supporting files) and what resources may be impacted by an identified update. This information can be used to facilitate a resource upgrade that minimizes the impact on the tenant. For a tenant operating, for example, 50 virtual machines using OS images with a newly published or certified update, preferred embodiments deploy the update in batches, as explained in more detail below, to ensure all the tenant's resources (e.g., virtual machines) are not down at the same time, thereby reducing any service interruption to the tenant. In embodiments, the identification of tenant context may be based on information stored in a tenant upgrade profile.

Tenant context can be managed, at a high level, based on a service level agreement (SLA). An SLA can generally refer to contract between a service provider and the tenant that defines the level of service expected from the service provider. SLAs are output-based in that their purpose is specifically to define what the customer will receive. SLAs do not define how the service itself is provided or delivered. The metrics that define levels of service for can aim to guarantee: reliability—when the service is available (percentage uptime) and the limits outages can be expected to stay within; responsiveness—the punctuality of services to be performed in response to requests and scheduled service dates; procedure for reporting problems—who can be contacted, how problems will be reported, procedure for escalation, and what other steps are taken to resolve the problem efficiently; monitoring and reporting service level—who will monitor performance, what data will be collected and how often as well as how much access the customer is given to performance statistics; consequences for not meeting service obligations, etc.

Tenant context may also include regional characteristics of a tenant infrastructure. For example, knowledge of the distribution of deployed resources in a tenant infrastructure may be leveraged to improve upgrade service. For example, and as will become apparent from the discussion below, the existence of one or more region pairs (also called geopairs) in a tenant infrastructure may inform the flow of the platform-managed upgrade workflow. With respect to geopairs, a cloud service provider may operate in various geographic regions, for example, by hosting an array of servers within one or more datacenters in each region. A region may be further subdivided into geopairs. For example, North America can be subdivided into North Central and South Central pairs and/or East and West pairs. Geopairs can be connected to each other to offer benefits when utilized together in the same distributed or redundant system. Geopairs may be selected, for example, to address various considerations including replication, redundancy, internet latency and geo-political concerns, to name a few. The system may identify the existence of geopairs as part of the tenant context.

Tenant context may also include availability requirements for a tenant infrastructure. For example, availability of an application considers the availability of its underlying infrastructure and dependent services. Available applications remove single points of failure through redundancy and resilient design. Availability requirements may specify one or more availability zones within a region. An availability zone is a defined zone-tier isolated point of failure for a computing construct with a low-latency connection to other availability zones. Availability requirements may also specify one or more computing clusters defined within availability zones. Each computing cluster can have one or more cluster-tenants (defined instance of a portion of a computing cluster) allocated to virtual machine sets for availability isolation tiers (e.g., a fault-tier or update-tier) that define isolated points of failures for computing constructs. Virtual machine sets having a plurality of virtual machines instances are allocated to cluster-tenants across availability zones or within a single availability zone based on availability requirements (e.g., parameters for tenant infrastructure availability), which may be provided by a tenant and associated with the tenant upgrade profile. The system may identify the existence of availability requirements as part of the tenant context. In this manner, the system upgrade process is aware of cross-zonal and cross-regional availability requirements of all tenants deployed by all customers, and can roll out updated files such as new OS images or VM extensions honoring the cross-zonal and cross-regional availability.

Deployed tenant resources that have been identified are batched for processing to ensure the identified resources are not all down at the same time. The batching can be performed based on information stored in the tenant upgrade profile such as a preferred batch size. By way of nonlimiting example, where an update to an OS image has been identified, and 100 virtual machines of a tenant have been identified as using an OS image to be updated, the 100 virtual machines may be batched into groups (batches) of 20 (or some other number). Of course, the batches need not be the same size. Sometimes, deployed resources that have been identified for a tenant can be grouped into one batch.

Generally, a resource being upgraded will not be available for use by a tenant. In preferred embodiments, less than all batches are processed at once (e.g., one batch is processed at a time) to ensure not all batched resources are unavailable at a given time. The resources in a given batch are upgraded (e.g., all at once, sequentially, in groups, etc.), and a diagnostic test is performed on the upgraded resource(s) to determine whether the identified update was successfully deployed. Batched resources can be upgraded with or without tenant intervention. For example, in some embodiments, a tenant may be provided with a notification that one or more batched resources are ready for upgrading, and a time limit may be provided to the tenant within which the tenant may choose to trigger the upgrade. If the tenant does not trigger the upgrade within the allotted time, the upgrade may proceed automatically. Additionally and/or alternately, batched resources may be upgraded without prompting the tenant. To continue with the example above, where an identified tenant has 100 VMs using OS images that need to be upgraded in batches of 20, the OS update can be deployed on the first batch and a diagnostic test performed. For example, the system can monitor the health of one or more applications running on each upgraded VM at the end of every upgrade and/or every batch. Diagnostic rules (e.g., application health evaluation rules) can be defined, for example, by a tenant and can be provided, for example, while opting for an automatic upgrade feature. In some embodiments, diagnostic rules can be implemented with an executable diagnostic script (e.g., provided by a tenant, derived from diagnostic rules, etc.). The diagnostic script may be associated with the tenant upgrade profile and executed during the diagnostic test. In this manner, the autonomous upgrade system determines whether an update has been successfully deployed on an upgraded resource.

The upgrade workflow may continue in this regard based on telemetry and control information. For example, the normal workflow may be to process and perform diagnostic test(s) on one batch at a time. If the resources in that batch are successfully upgraded, the system may move on to the next batch, and so on, until all the batches are processed. If one or more resources deployed by tenant were not successfully upgraded, the tenant may be notified. During this process, the system may monitor certain telemetry. For example, the system may determine success metrics for deployed updates on a per tenant basis, such as a percentage of a tenant's resources (e.g., VMs) successfully upgraded, and/or a successful deployment of one resource (VM) in a geopair. Additionally and/or alternatively, the system may determine a roll out status measured across all eligible tenants, those falling within a particular geographic region, or some other subdivision of eligible tenants. For a given update, the system can determine, by way of nonlimiting example, a roll out progress (e.g., percent of eligible resources or eligible tenants upgraded), a success rate and/or an elapsed time since a given update was rolled out. This telemetry can be provided to the publisher of an update and/or a tenant.

The autonomous upgrade system can use telemetry and inputs from tenants and publishers to control the upgrade workflow. For example, the system may include a tenant cutoff to stop or pause a tenant upgrade process under various circumstances, such as when a certain percentage of a tenant's resources fail to upgrade or a tenant cancels an upgrade. A tenant cutoff can also be based on deployment of an update to one resource (e.g., a VM) in a geopair. For example, a failed deployment to one region may prevent an update in a paired region. In another example, a successful deployment to one region may be used to permit an upgrade a paired region, overriding control logic that would otherwise stop the upgrade process. Tenant cutoff preferences may be provided by a tenant and associated with the tenant upgrade profile. The autonomous upgrade system may also include a roll out cutoff for a particular upgrade and which may be defined universally (i.e., for all tenants participating in the autonomous upgrade system), on a regional basis, on a tenant basis, or some other division. For example, the system may stop or pause an update roll out (e.g., regionally) if a certain percentage of resources (e.g., located within the regional) fail to properly upgrade or when a publisher cancels a roll out. In the event of a roll out cutoff, a publisher of an update that failed to deploy may be notified, and the update can be rescinded from its repository, making it inaccessible.

In some embodiments, published updates are certified for deployment to a distributed computing environment. Generally, the system receives a newly published update such as an OS image or a VM extension from a publisher. Newly published updates may be sent to a test environment (e.g., in a distributed computing environment) and deployed to one or more applications running in the test environment. A diagnostic test can be performed (e.g., to test and monitor the health of these applications) to determine whether the update was successfully deployed to the test environment. Updates that were successfully deployed can be certified. Alternately and/or additionally, newly published updates can be sent to a low impacting region of a distributed computing environment and deployed to one or more applications running in the low impacting region. A diagnostic test can be performed to determine whether the update was successfully deployed to the low impacting region, and updates that were successfully deployed can be certified. Generally, certifications can be understood as attestations that newly published updates have been tested and/or verified. In this manner, certified updates can be published for deployment to a distributed computing environment.

Thus, autonomous upgrade of deployed resources in a distributed computing environment can be achieved based on identifying an update to a computer file (such as a newly published or certified update) for deployment to a distributed computing environment, identifying a tenant infrastructure with deployed resources that use the file or may otherwise be impacted by the update, accessing a tenant upgrade profile, batching the tenant's deployed resources, deploying the update to the batched resources and performing a diagnostic test in accordance with the tenant upgrade profile to determine whether the update was successfully deployed.

With reference to FIG. 1, embodiments of the present disclosure can be discussed with reference to an exemplary distributed computing environment that serves as an operating environment for implementing the functionality described herein with respect to autonomous upgrade system 100. Autonomous upgrade system 100 includes cloud provider autonomous upgrade system 110, publisher system 160 and tenant system 170. The components of autonomous upgrade system 100 may communicate with each other via a network 150, which may include, without limitation, one or more local area networks (LANs) and/or wide area networks (WANs). Such networking environments are commonplace in offices, enterprise-wide computer networks, intranets, and the Internet.

In the embodiment depicted in FIG. 1, cloud provider autonomous upgrade system 110 includes interface component 112, tenant upgrade profile component 114, certification component 116, upgrade manager component 118 and telemetry & control (TC) component 128. Generally, certification component 116 receives newly published updates (e.g., OS images, VM extensions, etc.) from publisher system 160, such as by way of interface component 112 and network 150. Certification component 116 can send received updates to a test environment, for example, in a distributed computing environment. Certification component 116 deploys received updates to one or more sets of applications running in the test environment, performs a diagnostic test (e.g., to test and monitor the health of the applications), and certifies updates that were successfully deployed. In some embodiments, certification component 116 can send received updates to low impacting regions of a distributed computing environment. In some embodiments, certification component 116 deploys received updates to one or more sets of applications running in a low impacting region of a distributed computing environment, performs a diagnostic test (e.g., to test and monitor the health of the applications), and certifies updates that were successfully deployed. In this manner, certification component 116 can publish certified updates for deployment.

Tenant upgrade profile component 114 can store information relating to a tenant's participation in an upgrade service (e.g., opt-in status, status as a premium customer, batch size, information used to determine a successful deployment such as diagnostic rules and/or a diagnostic script, tenant context, tenant cutoff, tenant upgrade metrics, notification preferences, etc.). This information can be generated by the system (e.g., default values), received from tenant system 170 via network 150 and interface component 112 (e.g., tenant preferences) or received from TC component 128 (e.g., tenant context, tenant upgrade metrics, etc.).

Generally, upgrade manager component 118 manages the upgrade process, which includes upgrading a tenant infrastructure and determining a successful deployment. More specifically, upgrade manager component 118 identifies updates to computer files such as OS images and VM extensions for deployment in a distributed computing environment. For example, upgrade manager component 118 may identify newly published updates received from publisher system 160 (e.g., via network 150 and interface component 112). In some embodiments, upgrade manager component 118 may identify certified updates such as those published by certification component 116. Upgrade manager component 118 may prioritize updates for deployment (e.g., by giving priority to more important updates, premium-paying status of a publisher, etc.).

Upgrade manager component 118 can identify tenants eligible for an upgrade. For example, upgrade manager component 118 can identify participating tenants (e.g., tenants having opted in to an autonomous upgrade service) with deployed resources that may be impacted by the identified update (such as virtual machines spun up using an OS image with a newly published update). In some embodiments, upgrade manager component 118 can prioritize eligible tenants. Sometimes, the tenant identification and prioritization may be informed by information associated with a tenant and accessed via tenant upgrade profile component 114 (e.g., opt-in status, status as a premium paying customer, etc.).

In the embodiment depicted in FIG. 1, upgrade manager component 118 additionally includes batching component 120, upgrade component 112, diagnostics component 124 and TC interface component 126. Generally, upgrade manager component 118 can identify a tenant context such as what resources an identified tenant has deployed (e.g., machines such as virtual machines, configuration and applications in virtual machines, etc.) that may be impacted by an identified update and any regional characteristics of the resources (e.g., geopairs). In some embodiments, the identified tenant context can be received from TC component 128 via TC interface component 126.

Generally, batching component 120 of upgrade manager component 118 batches eligible tenant resources that have been identified for an upgrade. In some embodiments, the batching is informed by information received from tenant upgrade profile component 114 (e.g., default/preferred batch size). The upgrade manager component 118 is additionally configured to deploy the certified update by providing a threshold time, within which a tenant can trigger deploying the certified update, and after expiration of the threshold time, the certified update is configured to deploy automatically. Upgrade component 112 of upgrade manager component 118 upgrades the batched resources, for example, one a time, in groups, etc. Diagnostics component 24 of upgrade manager component 118 performs a diagnostic test on upgraded resources to determine whether an update was successfully deployed. In some embodiments, the diagnostic test is informed by information received from tenant upgrade profile component 114 (e.g., diagnostic rules, a diagnostic script, etc.). For example, if an eligible tenant has 100 batched VMs with a new OS image available, batching component 120 may batch VMs into groups of 10 based on that tenant's stored preference. Upgrade component 112 may spin down the VMs in the first batch, apply the OS image update to each VM, spin up each VM using the upgraded OS images and perform a diagnostic test on applications running in each VM, for example, by executing a diagnostic script provided by the tenant. In the embodiment depicted in FIG. 1, the results of the diagnostic testing are sent to TC component 128 via TC interface component 126 to perform workflow control. Generally, if resources are successfully upgraded, the workflow process continues. For example, if the batch described above was successfully processed, upgrade manager component 118 can move on to the next the batch and repeat the process until the batches have been completed or upgrade manager component 118 determines (e.g., receives a control signal) to stop the process. Of course, the present disclosure is not limited to a particular resource and batch processing order (e.g., serial processing), and various other resource and batch processing techniques are contemplated (e.g. parallel processing).

Generally, TC interface component 126 interfaces with TC component 128 and can exchange telemetry and control signals with TC component 128. For example, throughout the upgrade process, if upgrade manager component 118 receives a control signal indicating the upgrade process should stop (e.g., a tenant cancellation command received from a tenant system 170 via network 150, interface component 112 and TC interface component 126 or a tenant cutoff signal received from control component 136 of TC component 128 via TC interface component 126), upgrade manager component 118 stops the upgrade process work flow. Although the telemetry and control logic depicted in FIG. 1 resides externally from upgrade manager component 118, this need not be the case, as telemetry and control logic can reside within upgrade manager component 118 in various embodiments.

In some embodiments, cloud provider autonomous upgrade system 110 includes TC component 128, which further includes context component 130, tenant upgrade metrics component 132, roll out component 134 and control component 136. In embodiments where upgrade manager component 118 receives tenant context from context component 130, context component 130 can determine a tenant context such as what resources an identified tenant has deployed (e.g., machines such as virtual machines, configuration and applications in virtual machines, etc.) that may be impacted by an identified update and any regional characteristics of the resources (e.g., geopairs), and provide the tenant context to upgrade manager component 118 via TC interface component 126. Tenant upgrade metrics component 132 generally determines success metrics for deployed updates on a per-tenant basis. For example, tenant upgrade metrics component 132 can determine what percent of tenant's resources (e.g., VMs) have been successfully upgraded. Tenant upgrade metrics component 132 may also monitor whether one resource in a geopair has been successfully upgraded. Roll out component 134 generally determines a roll out status for a particular update (e.g., across all tenants, regionally, etc.). For example, roll out component 134 may determine a roll out progress (e.g., percentage of all eligible resources upgraded), success rate and the elapsed time. Generally, information generated by context component 130, tenant upgrade component 132 and roll out component 134 comprise telemetry.

Control component 136 controls the workflow and sends control signals based on telemetry, information accessed via tenant upgrade profile component 114 and/or information received from publisher system 160 or tenant system 170. For example, control component 136 can stop or pause the workflow by sending a control signal to upgrade manager component 118 via TC interface component 126. For example, control component 136 may generate a control signal to stop or pause a tenant upgrade if it determines a tenant cutoff threshold has been crossed. In some embodiments, a single resource that fails to upgrade properly can trigger a tenant cutoff. Sometimes, some other cutoff (e.g., 90%) can be specified (e.g., by default, tenant-specified, etc.) and accessed via tenant upgrade profile component 116 for use by control component 136. In some embodiments, the tenant cutoff can include more complex rules. For example, the tenant cutoff can be based on deployment of an update to one resource in a geopair. For example, if an update is successfully deployed to one of a tenant's geopairs, control component 136 can permit upgrade manager component 118 to update the other geopair, even if a threshold failure rate for that tenant has already been crossed. Similarly, if an update is not successfully deployed to one of a tenant's geopairs, control component 136 can inform upgrade manager component 118 not to update the other geopair, even if a threshold failure rate for that tenant has not yet been crossed. In some embodiments, a tenant can cancel an upgrade, for example, sending a cancellation command from tenant system 170. Similarly, control component 136 may generate a control signal to stop or pause a roll out of a particular update if it determines a roll out cutoff threshold has been crossed. In some embodiments, a publisher can cancel an upgrade, for example, sending a cancellation command from publisher system 160. In certain embodiments, these commands can be routed via control component 136 to streamline the control lines, variables or objects observed by upgrade manager component 118.

With continued reference to FIG. 1, interface component 112 provides the interface with publisher system 160 and tenant system 170 via network 150. Interface component 112 of cloud provider autonomous upgrade system 110 may include a publisher interface with publisher system 160 via network 150. The publisher interface can receive updates to computer files such as OS images or VM extensions for deployment to a distributed computing environment. The publisher interface may also notify a publisher of a faulty update (e.g., a faulty OS image), for example, based on a failed certification test or failed tenant deployment. The publisher interface may also provide a publisher with roll out progress for a particular update, including what regions have been updated, how many skill sets have been updated, etc. Roll out telemetry provided to a publisher may originate from TC component 128, which can provide telemetry to interface component 112 for distribution to publisher system 160 via network 150. The publisher interface may also receive an indication to cancel one or more roll outs, whether pending or future. Interface component 112 of cloud provider autonomous upgrade system 110 may also include a tenant interface with tenant system 170 via network 150. For example, the tenant interface may provide notifications of successful or failed upgrades, and may receive information used to diagnose the health of the tenant infrastructure (e.g., diagnostic rules, a diagnostic script, etc.). The tenant interface may also receive an indication to cancel one or more upgrades, whether pending or future. The tenant interface may also provide a tenant with tenant upgrade metrics for a particular update, including which deployed resources have been updated, any success or failure metrics, etc. Tenant upgrade metrics provided to a tenant may, but need not, originate from TC component 128, which can provide telemetry to interface component 112 for distribution to tenant system 170 via network 150.

In this manner, the autonomous upgrade system provides a marketplace for publishers (whether internal or external) to publish files such as OS images and VM extensions, and mechanisms to distribute updated builds of such files into the marketplace, allowing tenants to create virtual machines and applications based on those files, with limited service interruption.

A system, as used herein, refers to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Having identified various components of autonomous upgrade system 100, it is noted that any number of components may be employed to achieve the desired functionality within the scope of the present disclosure. The various components of FIG. 1 are shown with lines for the sake of clarity. Further, although some components of FIG. 1 are depicted as single components, the depictions are exemplary in nature and in number and are not to be construed as limiting for all implementations of the present disclosure. Autonomous upgrade system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2:
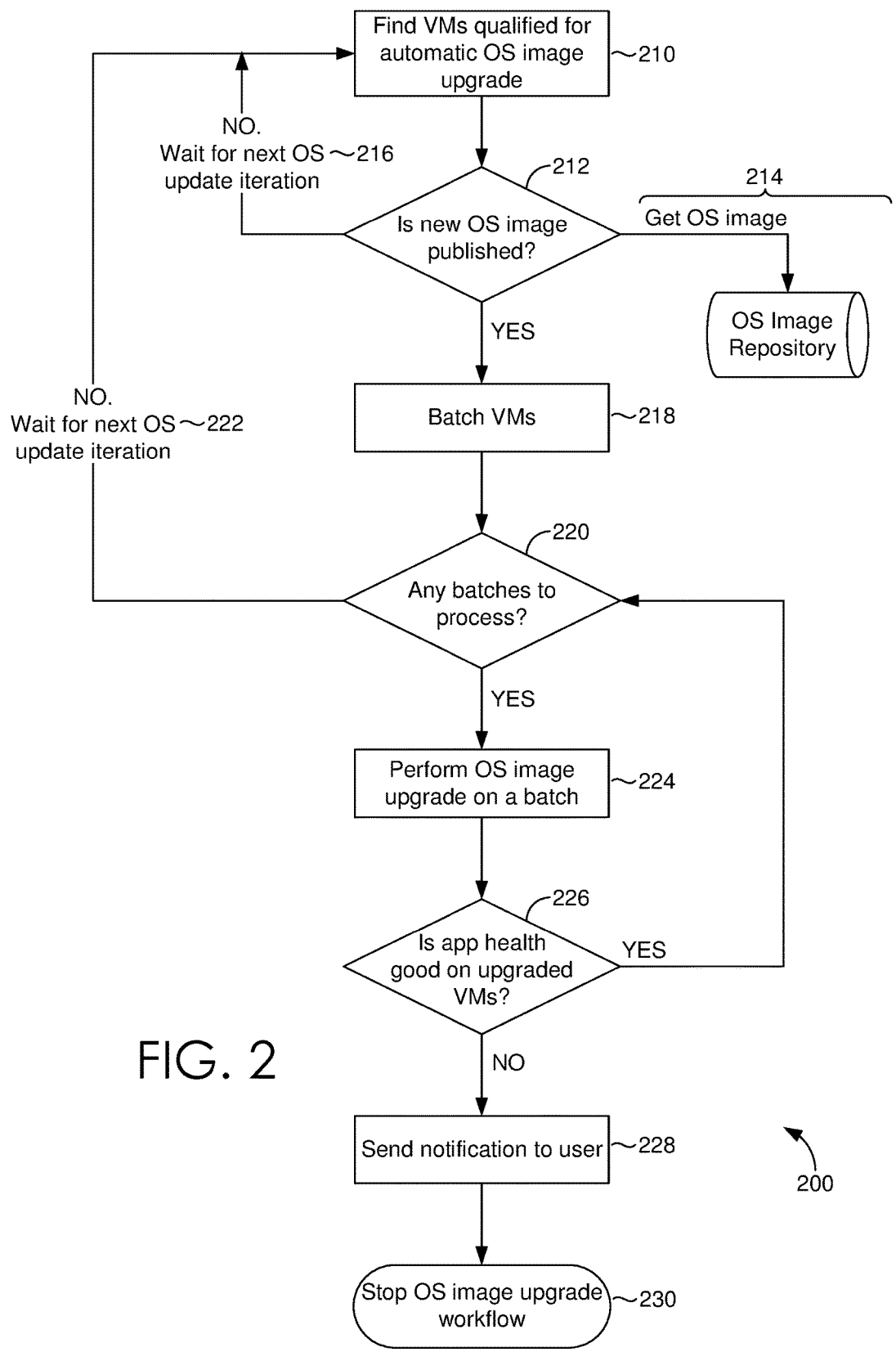
FIG. 2 is a flow diagram showing an exemplary method for providing an autonomous upgrade system, in accordance with embodiments described herein.

Turning now to FIG. 2, a flow diagram is provided that illustrates a method 200 for autonomously upgrading deployed resources in a distributed computing environment. More specifically, method 200 illustrates a method for autonomous upgrade of deployed virtual machines with an OS image update. The method 200 can be performed using the autonomous upgrade system described herein. In particular, one or more computer storage media having computer-executable instructions embodied thereon that, when executed, by one or more processors, can cause the one or more processors to perform method 200.

Initially at block 210, VMs that qualify for automatic OS image upgrade are identified. For example, only VMs belonging to tenants participating in an autonomous upgrade service might be identified. At block 212, newly published OS images are identified. If an OS image update is not available, method 200 waits for the next OS update iteration (block 216). If a newly published OS image is available, the new OS image is retrieved from an OS image repository (block 214), and the VMs that qualify for the update are batched (block 218). At block 220, batches that have not been processed are identified. If there is at least one batch to process, at block 224, the OS images for VMs in a batch are upgraded. Once the VMs are spun up using the upgraded OS image, at block 226, the health of one or more applications running on the upgraded VMs is tested to determine whether the upgrade was successfully deployed. If the upgrade was successful, method 200 returns to block 220 to process any remaining batches until, at block 222, there are no more batches left to process. If at block 226, it is determined that one of the tested applications running in the upgraded VM is not healthy, a notification is sent to the tenant and/or the publisher at block 228 and the workflow is halted at block 230.

Figure 3:
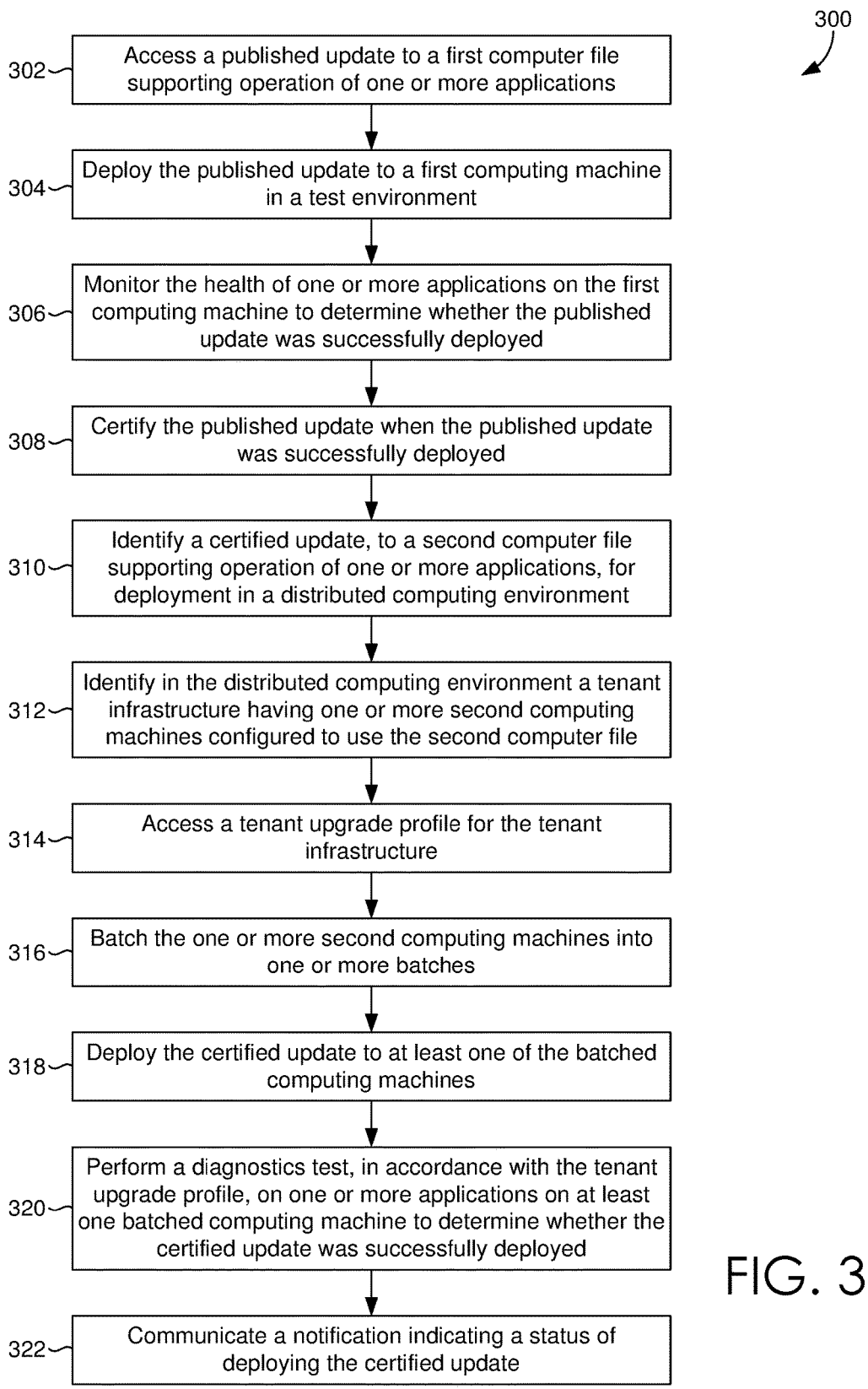
FIG. 3 is a flow diagram showing an exemplary method for providing an autonomous upgrade system, in accordance with embodiments described herein.
Figure 4:
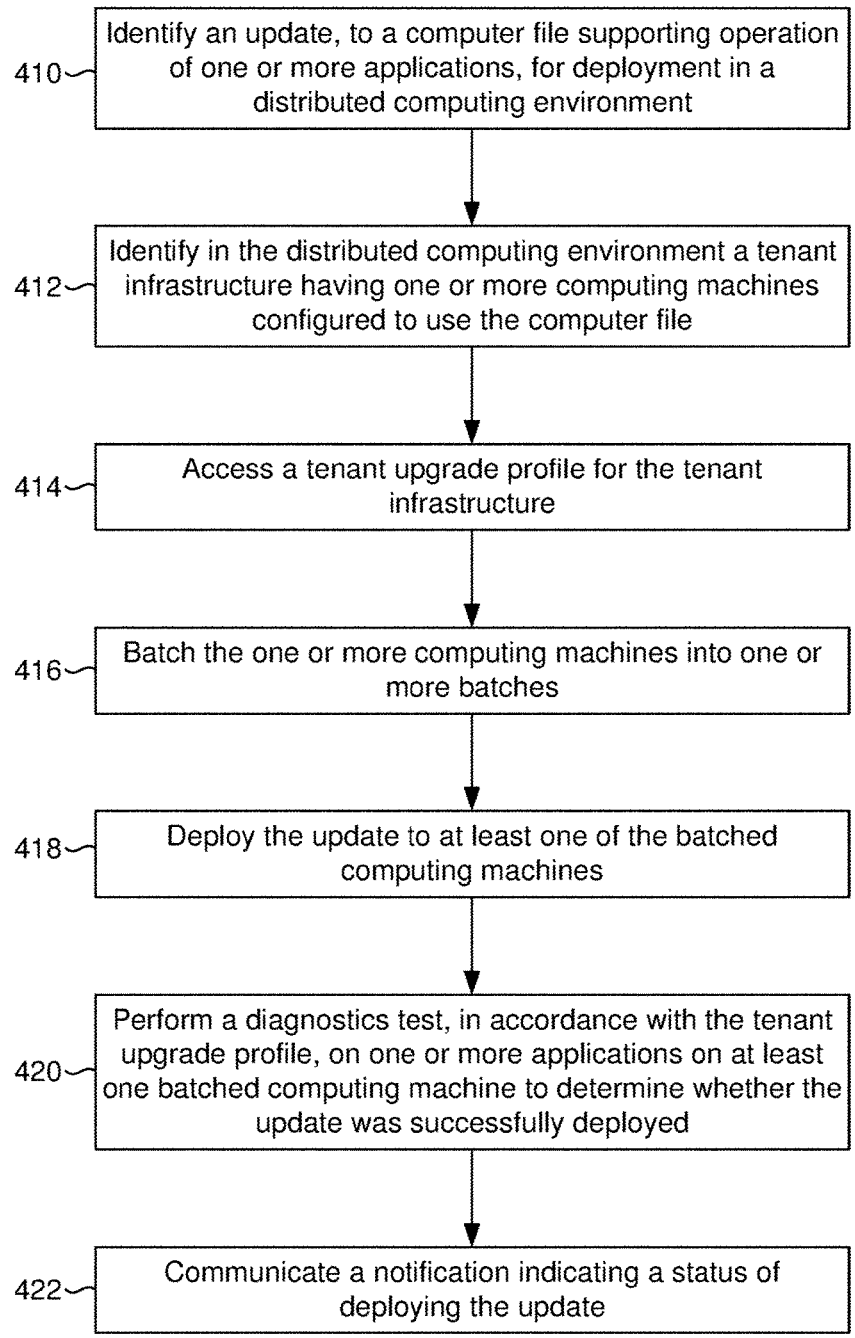
FIG. 4 is a flow diagram showing an exemplary method for providing an autonomous upgrade system, in accordance with embodiments described herein.

With reference to FIGS. 3 and 4, flow diagrams are provided illustrating methods for autonomously upgrading deployed resources in a distributed computing environment. The methods can be performed using the autonomous upgrade system described herein. In embodiments, one or more computer storage media having computer-executable instructions embodied thereon that, when executed, by one or more processors, can cause the one or more processors to perform the methods in the autonomous upgrade system.

Turning now to FIG. 3, a flow diagram is provided that illustrates a method 300 for autonomously upgrading deployed resources in a distributed computing environment. The method 300 can be performed using the autonomous upgrade system described herein. Initially at block 302, a published update to a first computer file supporting operation of one or more applications is accessed. At block 304, published update is deployed to a first computing machine in a test environment. At block 306, the health of one or more applications on the first computing machine is monitored to determine whether the published update was successfully deployed. At block 308, the published update is certified when it is determined that the published update was successfully deployed.

At block 310, a certified update to a second computer file supporting operation of one or more applications is identified for deployment in a distributed computing environment. At block 312, a tenant infrastructure in the distributed computing environment and having one or more second computing machines configured to use the second computer file is identified. At block 314, a tenant upgrade profile for the tenant infrastructure is accessed. At block 316, the one or more second computing machines are batched into one or more batches. At block 318, the certified update is deployed to at least one of the batched computing machines. At block 320, a diagnostics test is performed, in accordance with the tenant upgrade profile, on one or more applications on at least one batched computing machine to determine whether the certified update was successfully deployed. At block 322, a notification indicating a status of deploying the certified update is communicated.

Turning now to FIG. 4, a flow diagram is provided that illustrates a method 400 for autonomously upgrading deployed resources in a distributed computing environment. The method 400 can be performed using the autonomous upgrade system described herein. Initially at block 410, an update to a computer file supporting operation of one or more applications is identified for deployment in a distributed computing environment. At block 412, a tenant infrastructure in the distributed computing environment and having one or more computing machines configured to use the computer file is identified. At block 414, a tenant upgrade profile for the tenant infrastructure is accessed. At block 416, the one or more computing machines are batched into one or more batches. At block 418, the update is deployed to at least one of the batched computing machines. At block 420, a diagnostics test is performed, in accordance with the tenant upgrade profile, on one or more applications on at least one batched computing machine to determine whether the update was successfully deployed. At block 422, a notification indicating a status of deploying the update is communicated.

With reference to the autonomous upgrade system, embodiments described herein support autonomously upgrading deployed resources in a distributed computing environment. The autonomous upgrade system components refer to integrated components for autonomous upgrading. The integrated components refer to the hardware architecture and software framework that support autonomous upgrade functionality using the autonomous upgrade system. The hardware architecture refers to physical components and interrelationships thereof and the software framework refers to software providing functionality that can be implemented with hardware embodied on a device. The end-to-end software-based autonomous configuration system can operate within the autonomous configuration system components to operate computer hardware to provide autonomous upgrade system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the autonomous upgrade system components can manage resources and provide services for the autonomous upgrade system functionality. Any other variations and combinations thereof are contemplated with embodiments of the present invention.

By way of example, the autonomous upgrade system can include an API library that includes specifications for routines, data structures, object classes, and variables may support the interaction between the hardware architecture of the device and the software framework of the autonomous upgrade system. These APIs include configuration specifications for the autonomous upgrade system such that the different components therein can communicate with each other in the autonomous upgrade system, as described herein.

Figure 5:
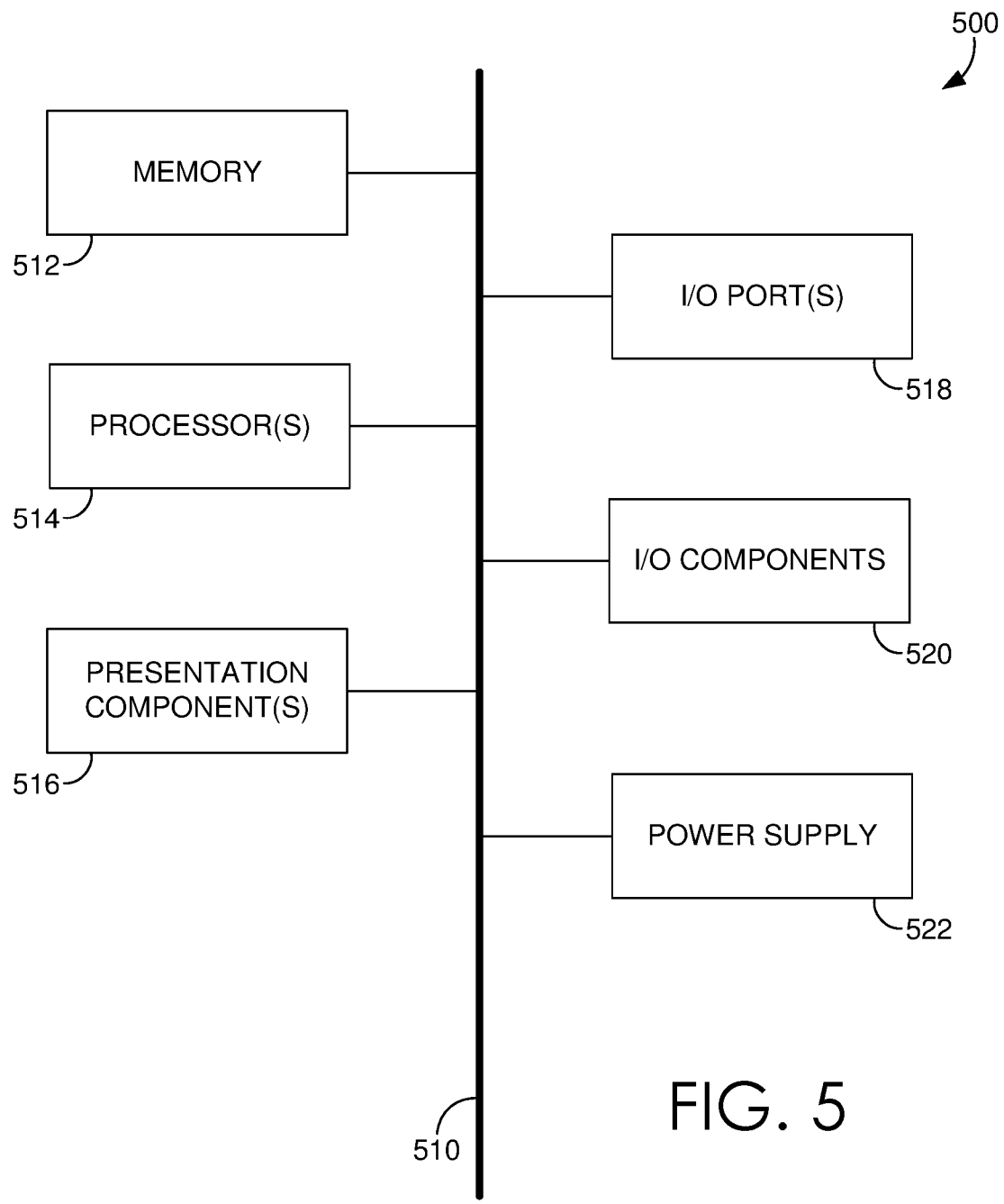
FIG. 5 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 612 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Figure 6:
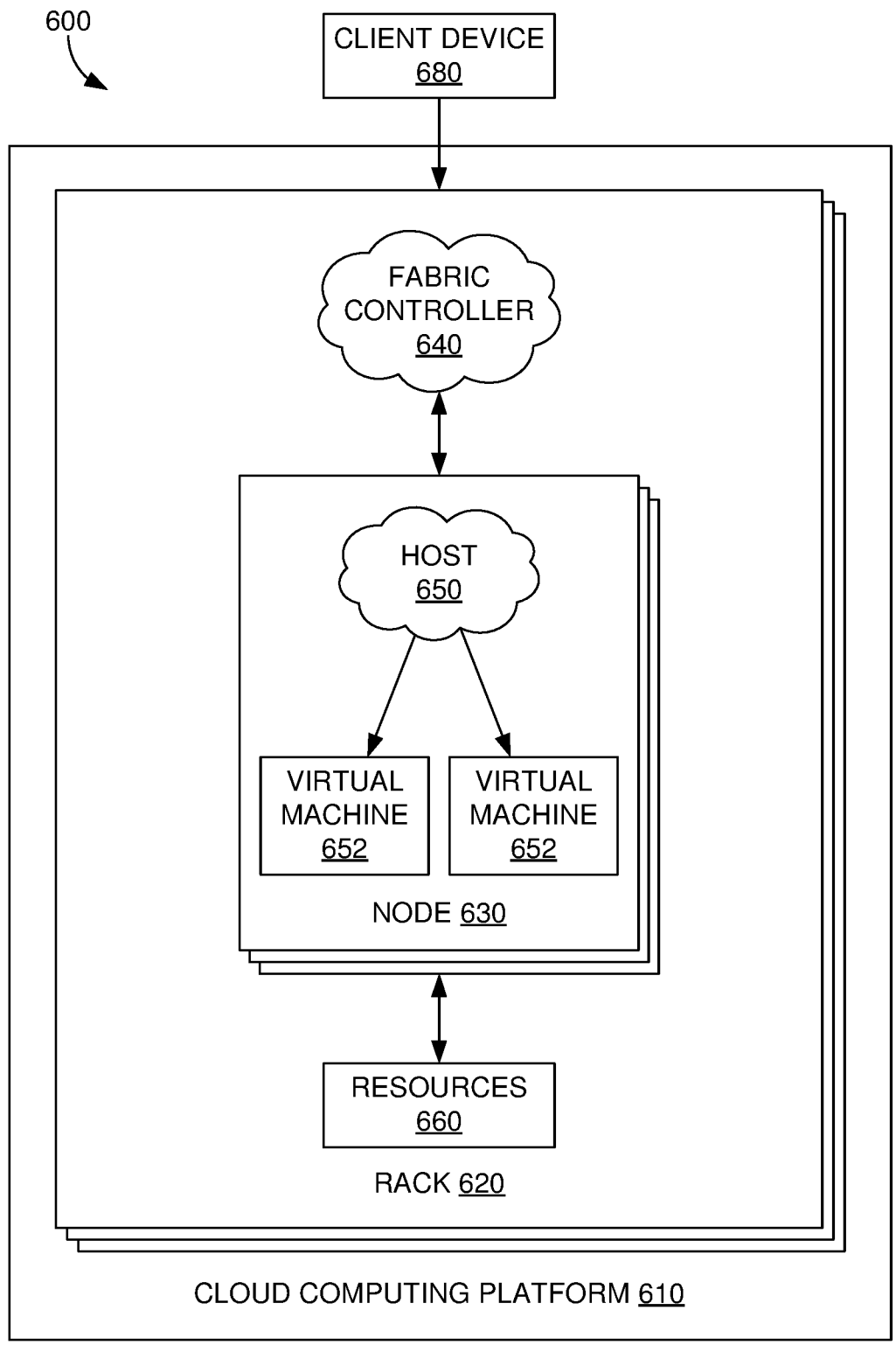
FIG. 6 is a block diagram of an exemplary distributed computing environment suitable for use in implementing embodiments described herein.

Referring now to FIG. 6, FIG. 6 illustrates an exemplary distributed computing environment 600 in which implementations of the present disclosure may be employed. In particular, FIG. 6 shows a high level architecture of the autonomous upgrade system ("system") in a cloud computing platform 610, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 600 that includes the cloud computing platform 610, rack 620, and node 630 (e.g., computing devices, processing units, or blades) in rack 620. The system can be implemented with a cloud computing platform 610 that runs cloud services across different data centers and geographic regions. The cloud computing platform 610 can implement a fabric controller 640 component for provisioning and managing resource allocation, deployment, upgrade, and management of cloud services. Typically, the cloud computing platform 610 acts to store data or run service applications in a distributed manner. The cloud computing infrastructure 610 in a data center can be configured to host and support operation of endpoints of a particular service application. The cloud computing infrastructure 610 may be a public cloud, a private cloud, or a dedicated cloud.

The node 630 can be provisioned with a host 650 (e.g., operating system or runtime environment) running a defined software stack on the node 630. Node 630 can also be configured to perform specialized functionality (e.g., compute nodes or storage nodes) within the cloud computing platform 610. The node 630 is allocated to run one or more portions of a service application of a tenant. A tenant can refer to a customer utilizing resources of the cloud computing platform 610. Service application components of the cloud computing platform 610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 630, the nodes may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in the cloud computing platform 610. It is contemplated that resources can be configured for specific service applications. Further, each service application may be divided into functional portions such that each functional portion is able to run on a separate virtual machine. In the cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in the cloud computing platform 610. The client device 680 may be any type of computing device, which may correspond to computing device 600 described with reference to FIG. 6, for example. The client device 680 can be configured to issue commands to cloud computing platform 610. In embodiments, client device 680 may communicate with service applications through a virtual Internet Protocol (IP) and load balancer or other means that direct communication requests to designated endpoints in the cloud computing platform 610. The components of cloud computing platform 610 may communicate with each other over a network (not shown), which may include, without limitation, one or more local area networks (LANs) and/or wide area networks (WANs).

Having described various aspects of the distributed computing environment 600 and cloud computing platform 610, it is noted that any number of components may be employed to achieve the desired functionality within the scope of the present disclosure. Although the various components of FIG. 6 are shown with lines for the sake of clarity, in reality, delineating various components is not so clear, and metaphorically, the lines may more accurately be grey or fuzzy. Further, although some components of FIG. 6 are depicted as single components, the depictions are exemplary in nature and in number and are not to be construed as limiting for all implementations of the present disclosure.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the autonomous upgrade system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for implementing autonomous upgrade of distributed computing machines, the system comprising:
   a certification component configured to:
      access a published update to a first computer file, wherein the first computer file supports operating one or more applications;
      deploy the published update to a first computing machine in a test environment, wherein the first computing machine is configured to use the first computer file to support operating one or more first applications when running in the test environment;
      monitor a health of the one or more first applications on the first computing machine to determine whether the published update was successfully deployed to the first computing machine; and
      certify the published update when the published update was successfully deployed to the first computing machine;
   an upgrade manager component configured to:

identify a certified update to a second computer file for deployment in a distributed computing environment, wherein the second computer file supports operating one or more applications;

identify in the distributed computing environment a tenant infrastructure having one or more second computing machines configured to use the second computer file to support operating one or more second applications when running in the distributed computing environment;

access a tenant upgrade profile for the tenant infrastructure, wherein the tenant upgrade profile instructs on an upgrade process and one or more availability requirements for the tenant infrastructure;

batch the one or more second computing machines into one or more batches in accordance with the tenant upgrade profile, deploy the certified update to at least one of the batched computing machines;

perform a diagnostic test, in accordance with the tenant upgrade profile, on the one or more second applications on at least one batched computing machine to determine whether the certified update was successfully deployed to the at least one batched computing machine; and an interface component configured to:
communicate a notification indicating a status of deploying the certified update to the at least one batched computing machine.

2. The system of claim 1, wherein the upgrade process is configured to instruct on at least one of how to upgrade the tenant infrastructure using the one or more availability requirements or how to determine a successful deployment.

3. The system of claim 1, wherein the upgrade process includes an executable diagnostic script configured to implement one or more diagnostic rules to diagnose a health of one or more upgraded resources in the tenant infrastructure during the diagnostic test.

4. The system of claim 1, wherein the upgrade manager component is additionally configured to halt a tenant upgrade workflow based on at least one of one or more tenant upgrade metrics or one or more regional characteristics of the batched computing machines.

5. The system of claim 1, wherein the upgrade manager component is additionally configured to deploy the certified update by providing a threshold time, within which a tenant can trigger deploying the certified update, and after expiration of the threshold time, the certified update is configured to deploy automatically.

6. The system of claim 1, wherein the tenant upgrade profile comprises a tenant context comprising at least an indication of what resources have been deployed in the tenant infrastructure and the one or more availability requirements, and wherein the upgrade manager component is configured to deploy the certified update based on the tenant context.

7. The system of claim 1, wherein the first and second computer files are operating system images.

8. A computer-implemented method for providing autonomous upgrade of distributed computing machines, the method comprising:

identifying an update to a computer file for deployment in a distributed computing environment, wherein the computer file supports operating one or more applications;

identifying in the distributed computing environment a tenant infrastructure having one or more computing machines configured to use the computer file to support operating one or more applications when running in the distributed computing environment;

accessing a tenant upgrade profile for the tenant infrastructure, wherein the tenant upgrade profile instructs on an upgrade process and one or more availability requirements for the tenant infrastructure;

batching the one or more computing machines into one or more batches in accordance with the tenant upgrade profile, deploying the certified update to at least one of the batched computing machines;

performing a diagnostic test, in accordance with the tenant upgrade profile, on the one or more applications on at least one batched computing machine to determine whether the certified update was successfully deployed to the at least one batched computing machine; and communicating a notification indicating a status of deploying the certified update to the at least one batched computing machine.

9. The method of claim 8, wherein the upgrade process instructs on at least one of how to upgrade the tenant infrastructure using the one or more availability requirements or how to determine a successful deployment.

10. The method of claim 8, wherein the upgrade process includes an executable diagnostic script configured to implement one or more diagnostic rules to diagnose a health of one or more upgraded resources in the tenant infrastructure during the diagnostic test.

11. The method of claim 8, additionally comprising halting a tenant upgrade workflow based on one or more tenant upgrade metrics.

12. The method of claim 8, wherein the tenant upgrade profile comprises a tenant context comprising at least an indication of what resources have been deployed in the tenant infrastructure and the one or more availability requirements, and wherein the deploying the certified update is based on the tenant context.

13. The method of claim 8, additionally comprising halting a roll out based on telemetry for the roll out, the telemetry indicating a percentage of failed deployments across all participating tenants.

14. The method of claim 8, wherein the computer file is an operating system image.

15. One or more computer storage media having computer-executable instructions embodied thereon that, when executed, by one or more processors, causes the one or more processors to perform a method for providing autonomous upgrade of distributed computing machines, the method comprising:

accessing a published update to a computer file, wherein the computer file supports operating one or more applications;

deploying the published update to a first computing machine in a test environment, wherein the first computing machine is configured to use the computer file to support operating one or more first applications when running in the test environment;

monitoring a health of the one or more first applications on the first computing machine to determine whether the published update was successfully deployed to the first computing machine;

certifying the published update when the published update was successfully deployed to the first computing machine;

identifying in a distributed computing environment a tenant infrastructure having one or more second computing machines configured to use the computer file to support operating one or more second applications when running in the distributed computing environment;

accessing a tenant upgrade profile for the tenant infrastructure, wherein the tenant upgrade profile is configured to instruct on an upgrade process and one or more availability requirements for the tenant infrastructure;

batching the one or more second computing machines into one or more batches in accordance with the tenant upgrade profile, deploying the certified update to at least one of the batched computing machines;

performing a diagnostic test, in accordance with the tenant upgrade profile, on the one or more second applications on at least one batched computing machine to determine whether the certified update was successfully deployed to the at least one batched computing machine; and communicating a notification indicating a status of deploying the certified update to the at least one batched computing machine.

16. The media of claim 15, wherein the upgrade process is configured to instruct on at least one of how to upgrade the tenant infrastructure using the one or more availability requirements or how to determine a successful deployment.

17. The media of claim 15, wherein the upgrade process includes an executable diagnostic script configured to implement one or more diagnostic rules to diagnose a health of one or more upgraded resources in the tenant infrastructure during the diagnostic test.

18. The media of claim 15, wherein the tenant upgrade profile comprises a tenant context comprising at least an indication of what resources have been deployed in the tenant infrastructure and the one or more availability requirements, and wherein the deploying the certified update is based on the tenant context.

19. The media of claim 15, the method additionally comprising halting a tenant upgrade workflow based on one or more regional characteristics of the batched computing machines.

20. The media of claim 15 the method additionally comprising halting a roll out based on telemetry for the roll out, the telemetry indicating a percentage of failed deployments across all participating tenants.

* * * * *